United States Patent
Cheng et al.

(10) Patent No.: US 11,907,340 B2
(45) Date of Patent: Feb. 20, 2024

(54) IMAGE POSITIONING DEVICE AND METHOD

(71) Applicant: Quanta Computer Inc., Taoyuan (TW)

(72) Inventors: Kai-Ju Cheng, Taoyuan (TW);
Yu-Hsun Chen, Taoyuan (TW);
Yu-Cheng Chien, Taoyuan (TW);
Chin-Yuan Ting, Taoyuan (TW);
Shao-Ang Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 383 days.

(21) Appl. No.: 17/389,623

(22) Filed: Jul. 30, 2021

(65) Prior Publication Data
US 2022/0366183 A1    Nov. 17, 2022

(30) Foreign Application Priority Data

May 12, 2021   (TW) ................................ 110117031

(51) Int. Cl.
| | | |
|---|---|---|
| *G06F 18/2431* | (2023.01) | |
| *G06V 10/40* | (2022.01) | |
| *G06N 3/08* | (2023.01) | |
| *G06F 18/213* | (2023.01) | |
| *G06F 18/23213* | (2023.01) | |

(52) U.S. Cl.
CPC ........ *G06F 18/2431* (2023.01); *G06F 18/213* (2023.01); *G06F 18/23213* (2023.01); *G06N 3/08* (2013.01); *G06V 10/40* (2022.01)

(58) Field of Classification Search
CPC ........... G06F 18/2431; G06F 18/23213; G06F 18/213; G06V 10/40; G06N 3/08

USPC .......................................................... 382/225
See application file for complete search history.

(56) References Cited

U.S. PATENT DOCUMENTS

| | | | |
|---|---|---|---|
| 10,133,717 B2 | 11/2018 | Wang et al. | |
| 2017/0067739 A1* | 3/2017 | Siercks | ...................... G06T 7/97 |
| 2018/0121721 A1* | 5/2018 | García | ................... G06V 20/10 |

FOREIGN PATENT DOCUMENTS

| | | |
|---|---|---|
| CN | 104616026 A | 5/2015 |
| TW | 201415854 A | 4/2014 |

OTHER PUBLICATIONS

Extended European Search Report dated Feb. 17, 2022, issued in application No. EP 21193161.3.

(Continued)

*Primary Examiner* — Michael R Neff
(74) *Attorney, Agent, or Firm* — McClure, Qualey & Rodack, LLP (57) ABSTRACT

An image positioning device is provided in the invention. The image positioning device includes a calculation circuit and a positioning circuit. The calculation circuit obtains a plurality of images from an image capturing device and classifies the images into a plurality of main groups based on a first algorithm, wherein each main group corresponds to a different area and the calculation circuit classifies the images of each main group into a plurality of sub-groups based on a feature of each image of each main group and a clustering algorithm. The positioning circuit is coupled to the calculation circuit. The positioning circuit positions each sub-group in the area corresponding to each main group based on the relative position relationship between each sub-group of each main group.

12 Claims, 5 Drawing Sheets

(56) References Cited

OTHER PUBLICATIONS

Jiang, W., et al.; "Indoor Localization with a Signal Tree;" 18th International Conference on Information Fusion; Jul. 2015; pp. 1724-1731.
Singh, G., et al.; "Fusing Semantics and Motion State Detection for Robust Visual SLAM;" Mar. 2020; pp. 2753-2762.
Chinese language office action dated Feb. 22, 2022, issued in application No. TW 110117031.

* cited by examiner

IMAGE POSITIONING DEVICE AND METHOD

CROSS REFERENCE TO RELATED APPLICATIONS

This application claims priority of TW Patent Application No. 110117031 filed on May 12, 2021, the entirety of which is incorporated by reference herein.

BACKGROUND OF THE INVENTION

Field of the Invention

The invention generally relates to image positioning technology, and more particularly, to image positioning technology in which image positioning is performed based on clustered images.

Description of the Related Art

As technology has progressed, positioning applications are being applied more widely. Therefore, how to generate a positioning result more accurately is a subject that is worthy of discussion.

BRIEF SUMMARY OF THE INVENTION

An image positioning device and method are provided to overcome the problems mentioned above.

An embodiment of the invention provides an image positioning device. The image positioning device comprises a calculation circuit and a positioning circuit. The calculation circuit obtains a plurality of images from an image capturing device and classifies the images into a plurality of main groups based on a first algorithm, wherein each main group corresponds to a different area and the calculation circuit classifies the images of each main group into a plurality of sub-groups based on a feature of each image of each main group and a clustering algorithm. The positioning circuit is coupled to the calculation circuit. The positioning circuit positions each sub-group in the area corresponding to each main group based on the relative position relationship between each sub-group of each main group.

In some embodiments, the first algorithm is a deep learning algorithm.

In some embodiments, the first algorithm is a triangle positioning algorithm.

In some embodiments, the image positioning device further comprises a feature capturing circuit. The feature capturing circuit is coupled to the calculation circuit. The feature capturing circuit generates a feature vector of each image of each main group, wherein the feature vector of each image is used as the feature of each image. The positioning circuit classifies the images in each main group into sub-groups based on the feature vector of each image of each main group and the clustering algorithm. In addition, the positioning circuit obtains the relative position relationship between each sub-group of each main group based on an image comparing algorithm, and positions each sub-group based on the relative position relationship.

In some embodiments, the image positioning device further comprises a feature capturing circuit. The feature capturing circuit is coupled to the calculation circuit. The feature capturing circuit sorts the images in each main group based on the time sequence of each of the images. Then, the feature capturing circuit obtains the first relative moving distance between each image and its previous image in each main group based on the second algorithm. Then, the feature capturing circuit obtains the second relative moving distance between each image and the first image in each main group based on the first relative moving distance corresponding to each image in each main group. The second relative moving distance of each image is used as the feature of each image. In the embodiments, the second algorithm is an image comparing algorithm or an IMU algorithm. The positioning circuit may classify the images in each main group into sub-groups based on the second relative moving distance of each image of each main group and the clustering algorithm. In addition, the positioning circuit may obtain the relative position relationship between each sub-group in each main group based on the second relative moving distance of each image of each main group and positions each sub-group based on the relative position relationship.

In some embodiments, the clustering algorithm is a k-means algorithm.

An embodiment of the invention provides an image positioning method. The image positioning method is applied to an image positioning device The image positioning method comprises the steps of using a calculation circuit of the image positioning device to obtain a plurality of images from an image capturing device; using the calculation circuit to classify the images into a plurality of main groups based on a first algorithm, wherein each main group corresponds to a different area; using the calculation circuit to classify the images of each main group into a plurality of sub-groups based on a feature of each image of each main group and a clustering algorithm; and using a positioning circuit of the image positioning device to position each sub-group in the area corresponding to each main group based on the relative position relationship between each sub-group of each main group.

Other aspects and features of the invention will become apparent to those with ordinary skill in the art upon review of the following descriptions of specific embodiments of an image positioning device and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
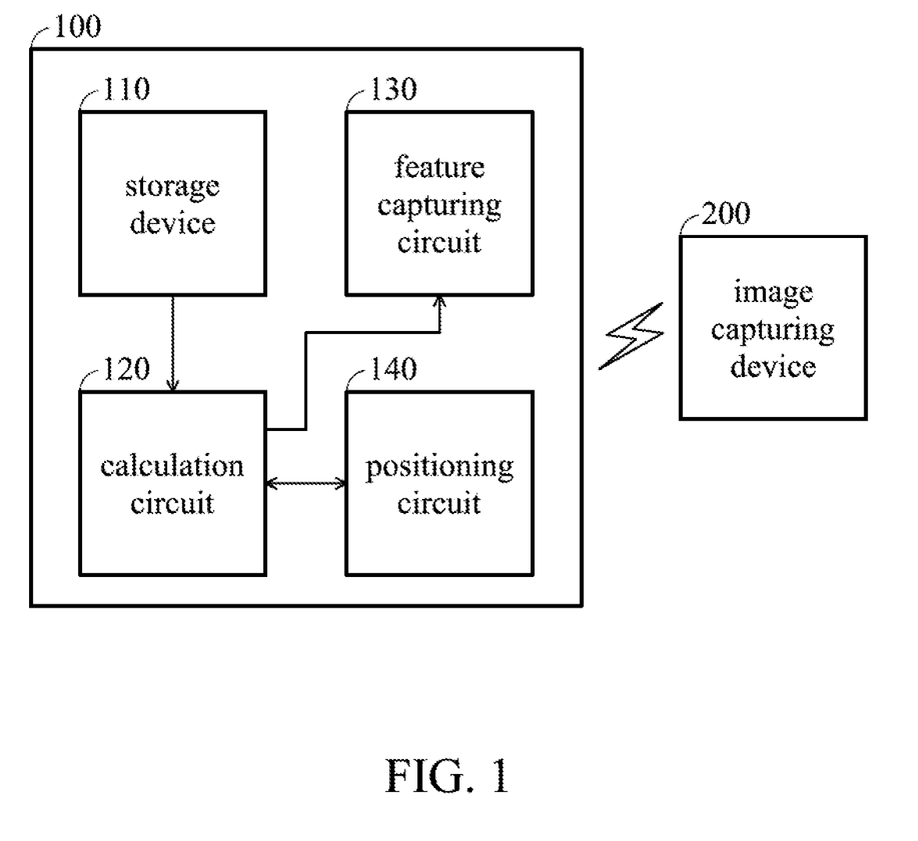
FIG. 1 is a block diagram of an image positioning device 100 according to an embodiment of the invention.

FIG. 1 is a block diagram of an image positioning device 100 according to an embodiment of the invention. As shown in FIG. 1, the image positioning device 100 may comprise a storage device 110, a calculation circuit 120, a feature capturing circuit 130, and a positioning circuit 140. It should be noted that FIG. 1 presents a simplified block diagram in which only the elements relevant to the invention are shown. However, the invention should not be limited to what is shown in FIG. 1. The image positioning device 100 may also comprise other elements and the connections between the elements may be different from the image positioning device 100. According to an embodiment of the invention, some or all of the calculation circuit 120, the feature capturing circuit 130, and the positioning circuit 140 may be integrated in a chip. In another embodiment, the storage device 110, the calculation circuit 120, the feature capturing circuit 130, and the positioning circuit 140 may also be integrated in a chip.

According to the embodiments of the invention, the storage device 110 may be a volatile memory (e.g. Random Access Memory (RAM)), or a non-volatile memory (e.g. flash memory, Read Only Memory (ROM)), a hard disk, or a combination of the above memory devices. The storage device 110 may store the required files and data for the image positioning, e.g. the information corresponding to a plurality of areas in a positioning environment, but the invention should not be limited thereto.

Figure 2:
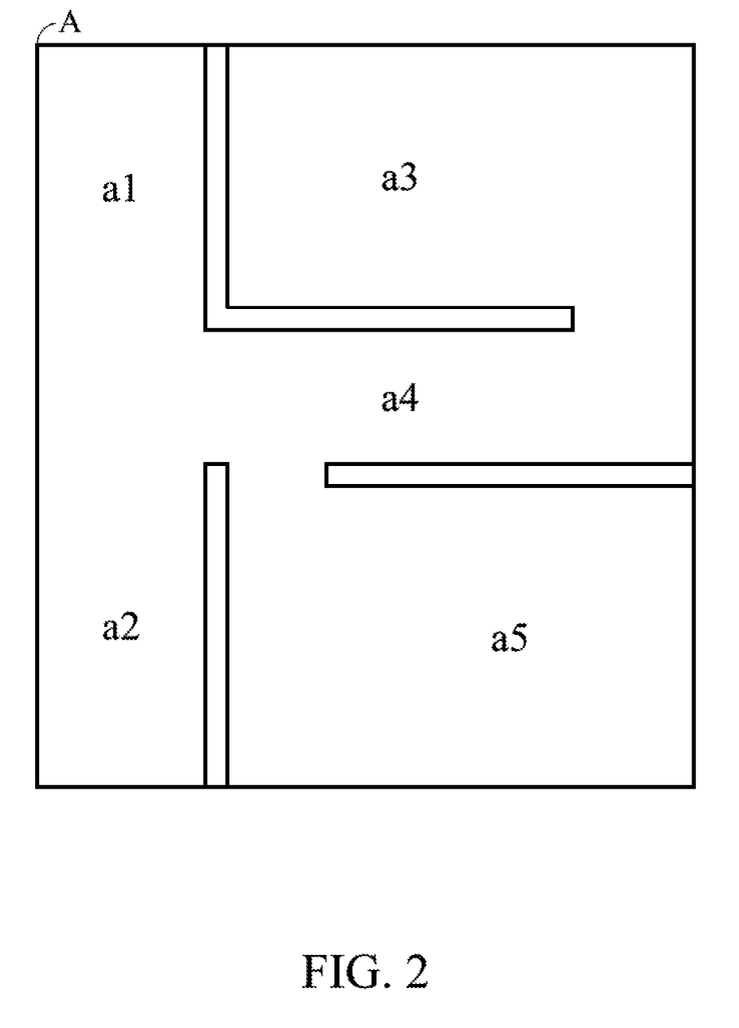
FIG. 2 is a schematic diagram illustrating a plurality of areas of a positioning environment according to an embodiment of the invention.

According to an embodiment of the invention, a positioning environment may be divided into a plurality of areas in advance, and the information of each area may be stored in the storage device 110. According to the embodiments of the invention, the positioning environment may be an oral cavity, an interior space (e.g. an office) or an outdoor space, but the invention should not be limited thereto. FIG. 2 is a schematic diagram illustrating a plurality of areas of a positioning environment according to an embodiment of the invention. As shown in FIG. 2, the positioning environment A may be divided into areas a1~a5 in advance, and the information of areas a1~a5 may be stored in the storage device 110, but the invention should not be limited thereto.

According to an embodiment of the invention, the information of each area may be the information of an access point (AP) in each area. That is to say, in the embodiment each area may be equipped an AP and each AP may has its corresponding information. According to the embodiments of the invention, the information of each area stored in the storage device 110 may comprise one or more information discussed in the above embodiments, but the invention should not be limited thereto.

According to an embodiment of the invention, the image positioning device 100 may obtain a plurality of images in a positioning environment from an image capturing device 200 (i.e. the images generated by the image capturing device 200 photographing different areas in the positioning environment), and position the images obtained from the image capturing device 200. Details are illustrated in the following embodiments.

According to an embodiment of the invention, the image capturing device 200 may be an electronic device with a photography function, e.g. a cell phone, a camera or a dental mirror, but the invention should not be limited thereto. According to an embodiment of the invention, the image capturing device 200 may comprise an inertial measurement unit (IMU) to generate the IMU information (e.g. position and angle information) of each image generated by the image capturing device 200.

According to an embodiment of the invention, the image capturing device 200 may transmit the captured images and the information of the images to the image positioning device 100 through a wireless communication method, e.g. Bluetooth, WIFI or mobile communications (e.g. cellular network). According to the embodiments of the invention, the information corresponding to each image may comprise the time information, the signal strength information (e.g. the received signal strength indication (RSSI)) and the IMU information, but the invention should not be limited thereto, wherein the signal strength information of one image is the signal strength received by the image capturing device 200 when the image capturing device 200 generates this image.

According to an embodiment of the invention, after the image positioning device 100 obtains the images corresponding to a positioning environment from the image capturing device 200, the calculation circuit 120 of the image positioning device 100 may classify the images into a plurality of main groups based on the information corresponding to the areas and a first algorithm, wherein each main group may correspond to an area. Taking FIG. 2 for example, the calculation circuit 120 may classify the images into a plurality of main groups based on the information corresponding to the areas a1~a5 and the first algorithm, wherein the images corresponding to the area a1 may be regarded as a first main group, the images corresponding to the area a2 may be regarded as a second main group, the images corresponding to the area a3 may be regarded as a third main group, the images corresponding to the area a4 may be regarded as a fourth main group and the images corresponding to the area a5 may be regarded as a fifth main group, but the invention should not be limited thereto.

According to an embodiment of the invention, the first algorithm may be a deep learning algorithm. The calculation circuit 120 of the image positioning device 100 may determine each image corresponds to which area based on the machine learning results stored in the storage device 110 and the deep learning algorithm to classify the images into multiple main groups.

According to another embodiment of the invention, when the information corresponding to each area is the information of AP equipped in each area, the first algorithm may be a tingle positioning algorithm. The calculation circuit 120 may classify the images into multiple main groups based on the tingle positioning algorithm and the signal strength information received by the image capturing device 200 when the image capturing device 200 generates each image (i.e. the signal strength information between the image capturing device 200 and different APs).

According to an embodiment of the invention, after the calculation circuit 120 classifies the images from the image capturing device 200 into multiple main groups, the feature capturing circuit 130 of the image positioning device 100 may capture the features of the images in each main group. Then, the calculation circuit 120 may classify the images in each main group into a plurality of sub-groups based on the features of the images in each main group and a clustering algorithm.

According to an embodiment of the invention, the clustering algorithm may be a k-means algorithm, but the invention should not be limited thereto. In the k-means algorithm, the user can decide how many sub-groups need to be classified in one main group (i.e. decide the number of the sub-groups in each main group) in advance. In addition, in the k-means algorithm, each sub-group may correspond to one kernel of the k-means algorithm. That is to say, the number of the kernels may be equal to the number of the sub-groups.

According to an embodiment of the invention, the feature capturing circuit 130 may generate a feature vector of each image in each main group based on deep learning algorithm, wherein each feature vector may be regarded as the feature of each image. Specifically, the feature capturing circuit 130 may input each image in each main group to a deep learning algorithm model to obtain the feature vector of each image. In the embodiment, the deep learning algorithm may be a Convolution Neural Network (CNN) algorithm (e.g. EfficientNet, ResNet, and so on), but the invention should not be limited thereto. In addition, in the embodiment, after the feature capturing circuit 130 obtains the feature vector of each image in each main group, the calculation circuit 120 may use the clustering algorithm (e.g. K-means algorithm) to classify the images in each main group into multiple sub-groups based on the feature vector of each image in each main group.

According to another embodiment of the invention, the feature capturing circuit 130 may sort the images in each main group based on the time sequence of the images. Then, the feature capturing circuit 130 may obtain the first relative moving distance between each image and its previous image in each main group based on the second algorithm. Then, in each main group, the feature capturing circuit 130 may obtain the second relative moving distance between each image and the first image based on the first relative moving distance between each image and its previous image, wherein the second relative moving distance between each image and the first image may be regarded as the feature of each image.

Figure 3:
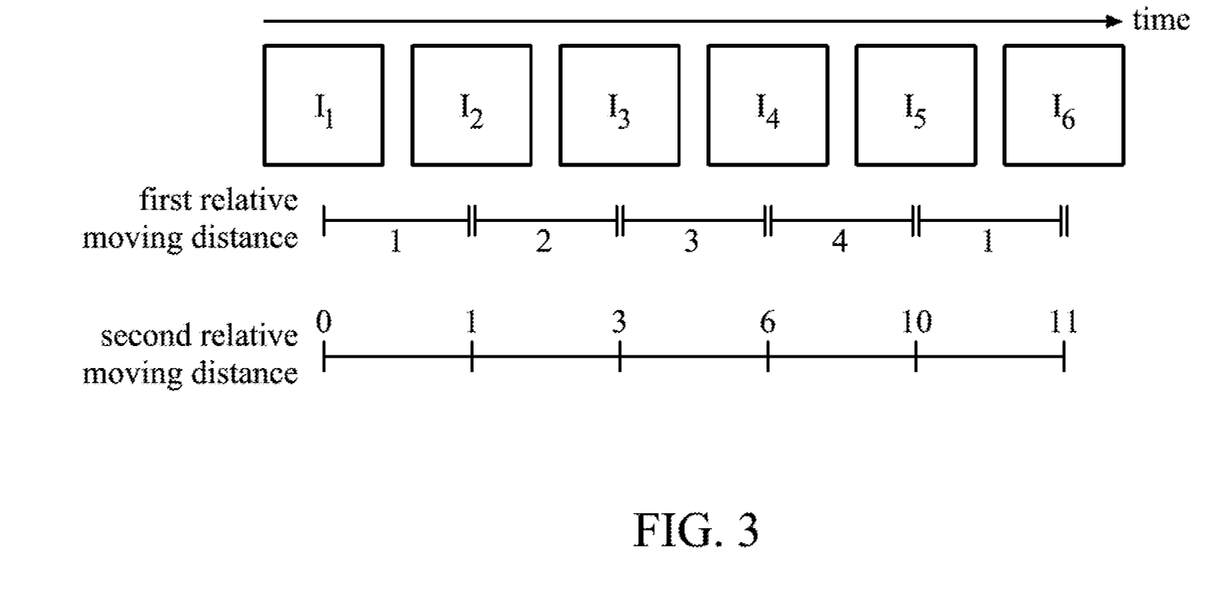
FIG. 3 is a schematic diagram illustrating the second relative distance between each image and the first image in a main group according to an embodiment of the invention.

Taking FIG. 3 for example, FIG. 3 is a schematic diagram illustrating the second relative distance between each image and the first image in a main group according to an embodiment of the invention. The feature capturing circuit 130 may sort the images $I_1 \sim I_6$ in a main group based on the time sequence of the images $I_1 \sim I_6$. Then, the feature capturing circuit 130 may use the second algorithm to calculate the first relative moving distance between the image $I_1$ and image $I_2$ (1 unit moving distance, wherein the unit may be pixel, centimeter, meter, and so on), the first relative moving distance between the image $I_2$ and image $I_3$ (2 unit moving distance), the first relative moving distance between the image $I_3$ and image $I_4$ (3 unit moving distance), the first relative moving distance between the image $I_4$ and image $I_5$ (4 unit moving distance), and the first relative moving distance between the image $I_5$ and image $I_6$ (1 unit moving distance). Finally, the feature capturing circuit 130 may obtain the second relative moving distance between the image $I_1$ and image $I_1$ (0 unit moving distance), the second relative moving distance between the image $I_2$ and image $I_1$ (1 unit moving distance), the second relative moving distance between the image $I_3$ and image $I_1$ (3 unit moving distance), the second relative moving distance between the image $I_4$ and image $I_1$ (6 unit moving distance), the second relative moving distance between the image $I_5$ and image $I_1$ (10 unit moving distance), and the second relative moving distance between the image $I_6$ and image $I_1$ (11 unit moving distance). It should be noted that FIG. 3 is used to illustrate the embodiment of the invention, but the invention should not be limited thereto. The first relative moving distance and the second relative moving distance may be negative values.

According to the embodiments of the invention, the second algorithm may be an image comparing algorithm or an IMU algorithm, but the invention should not be limited thereto. When the second algorithm is the image comparing algorithm, the feature capturing circuit 130 may use the image comparing algorithm to compare each image with its previous image in each main group (e.g. comparing the image $I_2$ with the image $I_1$ in FIG. 3) to obtain the first relative moving distance of each image. When the second algorithm is the IMU algorithm, the feature capturing circuit 130 may use the IMU algorithm to calculate the acceleration between each image and its previous image in each main group (e.g. obtain the acceleration between the image $I_2$ and the image $I_1$ in FIG. 3) to obtain the first relative moving distance of each image.

In addition, in the embodiment, after the feature capturing circuit 130 obtains the second relative moving distance of each image in each main group, the calculation circuit 120 may use the clustering algorithm (e.g. K-means algorithm) to classify the images in each main group into multiple sub-groups based on the second relative moving distance of each image in each main group.

According to the embodiments of the invention, after the calculation circuit 120 classify the images in each main group into multiple sub-groups, the positioning circuit 140 may calculate the relative position relationship between each sub-group of each main group, and position each sub-group in the corresponding area of each main group based on the relative position relationship between each sub-group of each main group. Details are illustrated below.

Figure 4:
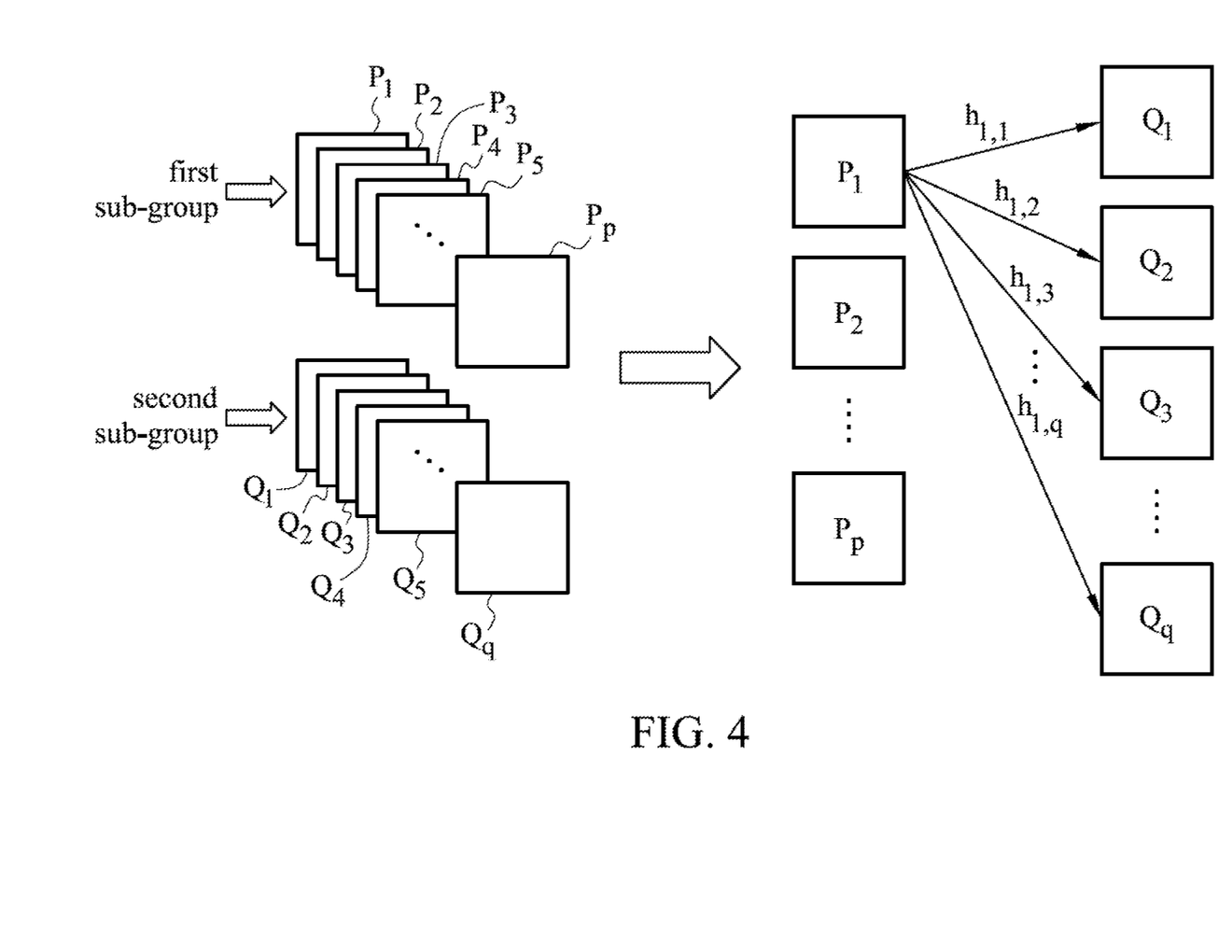
FIG. 4 is a schematic diagram illustrating a first sub-group and a second sub-group in a main group according to an embodiment of the invention.

According to an embodiment of the invention, when the calculation circuit 120 uses the clustering algorithm (e.g. k-means algorithm) classify the images in each main group into multiple sub-groups based on the feature vector of each image in each main group, the positioning circuit 140 may calculate the relative position relationship between each sub-group of each main group based on an image comparing algorithm (or an IMU algorithm). In the embodiment, the relative position relationship may a relative horizontal position relationship and/or a relative vertical position relationship. FIG. 4 is used as an example for illustration below. In the embodiment, after the positioning circuit 140 knows the relative position relationship between each sub-group in one main group, the positioning circuit 140 will be able to position the sub-groups in the area corresponding to the main group.

FIG. 4 is a schematic diagram illustrating a first sub-group and a second sub-group in a main group according to an embodiment of the invention. As shown in FIG. 4, the first sub-group comprises p images and the second sub-group comprises q images. The positioning circuit 140 may use the image comparing algorithm to calculate the moving distances $h_{1,1}, h_{1,2} \ldots$ and $h_{1,q}$ between the first image $P_1$ of the first sub-group and all images $Q_1 \sim Q_q$ of the second sub-group, wherein $h_{1,1}$ means the moving distance between the first image $P_1$ of the first sub-group and the first image Q1 of the second sub-group. Then, the positioning circuit 140 may take average for the moving distances $h_{1,1}, h_{1,2} \ldots$ and $h_{1,q}$ to obtain the average moving distance $m_1$ between the first image $P_1$ of the first sub-group and all images $Q_1 \sim Q_q$ of the second sub-group (i.e. $m_1 = (h_{1,1} + h_{1,2} + \ldots + h_{1,q})/q$). Accordingly, the positioning circuit 140 may calculate the average moving distances $m_1, m_2, \ldots m_p$ between each of the images $P_1 \sim P_p$ of the first sub-group and all images $Q_1 \sim Q_q$ of the second sub-group. Then, the positioning circuit 140 may take average for the average moving distances $m_1, m_2, \ldots m_p$ to obtain an average value r (i.e. $r = (m_1 + m_2 + \ldots + m_p)/p$). The positioning circuit 140 may know the relative position relationship between the first sub-group and the second sub-group based on the average value r. When the average value r is greater than 0, it means that the first sub-group is on the right of the second sub-group (or above the second sub-group). When the average value r is smaller than 0, it means that the first sub-group is on the left of the second sub-group (or below the second sub-group).

According to another embodiment of the invention, when the calculation circuit 120 uses the clustering algorithm (e.g. k-means algorithm) classify the images in each main group into multiple sub-groups based on the second relative moving distance of each image in each main group, the positioning circuit 140 may calculate the relative position relationship between each sub-group of each main group based on the second relative moving distance of each image in each main group and position the sub-groups in the area corresponding to each main group based on the relative position relationship between each sub-group in each main group. In the embodiment, the relative position relationship may a relative horizontal position relationship and/or a relative vertical position relationship.

As shown in FIG. 3, it is assumed that the image $I_1$, image $I_2$ and image $I_3$ are in the first sub-group, the image $I_4$ is in the second sub-group and the image $I_5$ and image $I_6$ are in the third sub group. The positioning circuit 140 may determine the relative position relationship between each sub-group and the image $I_1$ based on the average second relative moving distance of each sub-group to obtain the relative position relationship between the first sub-group, the second subgroup and the third sub-group. Specifically, when the average second relative moving distance of a sub-group is greater than 0, the positioning circuit 140 may determine that the sub-group is on the right of the image $I_1$ (or above the image $I_1$). When the average second relative moving distance of a sub-group is smaller than 0, the positioning circuit 140 may determine that the sub-group is on the left of the image $I_1$ (or below the image $I_1$). In addition, when the average second relative moving distance of a sub-group approaches to 0, the positioning circuit 140 may determine that the sub-group approaches to the image $I_1$. When the average second relative moving distance of a sub-group is far away from 0, the positioning circuit 140 may determine that the sub-group is far away from the image $I_1$. It should be noted that FIG. 3 is used to illustrate the embodiment of the invention, but the invention should not be limited thereto.

Figure 5:
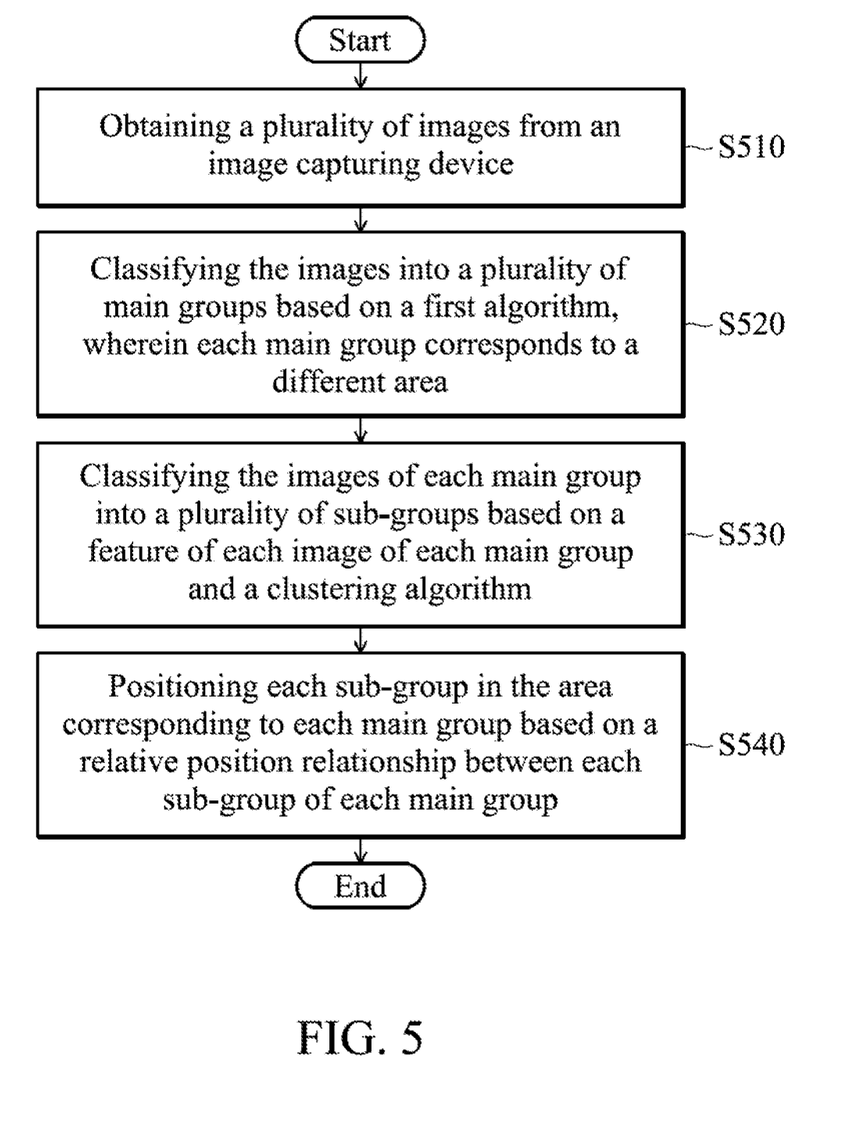
FIG. 5 is a flow chart illustrating an image positioning method according to an embodiment of the invention.

FIG. 5 is a flow chart illustrating an image positioning method according to an embodiment of the invention. The image positioning method can be applied to the image positioning device 100. As shown in FIG. 5, in step S510, a calculation circuit of the image positioning device 100 obtains a plurality of images from an image capturing device.

In step S520, the calculation circuit of the image positioning device 100 may classify the images into a plurality of main groups based on a first algorithm and the information corresponding to a plurality of areas stored in a storage device of the image positioning device 100, wherein each main group may correspond to different area.

In step S530, the calculation circuit of the image positioning device 100 may classify the images in each main group into a plurality of sub-groups based on the feature of each image in each main group and a clustering algorithm.

In step S540, a positioning circuit of the image positioning device 100 may position the sub-groups of each main group in the area corresponding to each main group based on the relative position relationship between each sub-group of each main group.

According to some embodiments of the invention, in the image positioning method, the first algorithm nay be a deep learning algorithm. The calculation circuit of the image positioning device 100 may classify the images into the main groups based on the deep learning algorithm.

According to some embodiments of the invention, in the image positioning method, the information corresponding to the areas may comprise the information of an access point (AP) equipped in each area, and the first algorithm is a triangle positioning algorithm. In the image positioning method, the calculation circuit of the image positioning device 100 may classify the images into the main groups based on the signal strength of the AP equipped in each area and the triangle positioning algorithm.

According to some embodiments of the invention, the image positioning method may further comprise that a feature capturing circuit of the image positioning device 100 may generate a feature vector of each image in each main group based on a deep learning algorithm, wherein each feature vector may be regarded as the feature of each image. In the embodiments, the positioning circuit of the image positioning device 100 may classify the images in each main group into a plurality of sub-groups based on the feature vector of each image and the clustering algorithm. In the embodiments, the positioning circuit 140 of the image positioning device 100 may obtain the relative position relationship between each sub-group of each main group based on an image comparing algorithm, and position each sub-group of each main group according to the relative position relationship between each sub-group.

According to some embodiments of the invention, the image positioning method further comprises that a feature capturing circuit of the image positioning device 100 may sort the images in each main group based on the time sequence of the images. Then, the feature capturing circuit of the image positioning device 100 may obtain the first relative moving distance between each image and its previous image in each main group based on the second algorithm. Then, the feature capturing circuit of the image positioning device 100 may obtain the second relative moving distance between each image and the first image in each main group based on the first relative moving distance corresponding to each image in each main group. The second relative moving distance between each image and the first image in each main group may be regarded as the feature of each image.

In the embodiments, the second algorithm may be an image comparing algorithm or an IMU algorithm. In the embodiments, the positioning circuit of the image positioning device 100 may classify the images in each main group into multiple sub-groups based on the second relative moving distance corresponding to each image of each main group and the clustering algorithm.

In the embodiments, the poisoning circuit of the image positioning device 100 may obtain the relative position relationship between each sub-group based on the second relative moving distance corresponding to each image of each main group, and position each sub-group according to the relative position relationship between each sub-group.

According to some embodiments of the invention, the clustering algorithm may be a k-means algorithm.

According to the positioning method provided in the invention, a plurality of images can be classified into different main groups first, and the images of each main group can be classified into different sub-groups. Then, the relative position relationship between each sub-group of each main group will be used to position the sub-groups. Therefore, in the positioning method provided in the invention, the multiple images can be positioned more accurately in its corresponding environment.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image positioning device, comprising:
    a calculation circuit, wherein the calculation circuit obtains a plurality of images from an image capturing device and classifies the images into a plurality of main groups based on a first algorithm, wherein each main group corresponds to a different area and the calculation circuit classifies the images of each main group into a plurality of sub-groups based on a feature of each image of each main group and a clustering algorithm;
    a positioning circuit, coupled to the calculation circuit, wherein the positioning circuit positions each sub-group in the area corresponding to each main group based on a relative position relationship between each sub-group of each main group; and
    a feature capturing circuit, coupled to the calculation circuit and sorting the images in each main group based on a time sequence of each image, obtaining a first relative moving distance between each image and its previous image in each main group based on a second algorithm, and obtaining a second relative moving distance between each image and the first image in each main group based on the first relative moving distance corresponding to each image in each main group, wherein the second relative moving distance of each image is taken as the feature of each image.

2. The image positioning device of claim 1, wherein the first algorithm is a deep learning algorithm or a triangle positioning algorithm.

3. The image positioning device of claim 1, wherein the second algorithm is an image comparing algorithm or an IMU algorithm.

4. The image positioning device of claim 1, wherein the positioning circuit classifies the images in each main group into the plurality of sub-groups based on the second relative moving distance of each image of each main group and the clustering algorithm.

5. The image positioning device of claim 4, wherein the positioning circuit obtains the relative position relationship between each sub-group in each main group based on the second relative moving distance of each image of each main group and positions each sub-group based on the relative position relationship.

6. The image positioning device of claim 1, wherein the clustering algorithm is a k-means algorithm.

7. An image positioning method, applied to an image positioning device, comprising:
    obtaining, by a calculation circuit of the image positioning device, a plurality of images from an image capturing device;
    classifying, by the calculation circuit, the images into a plurality of main groups based on a first algorithm, wherein each main group corresponds to a different area;
    classifying, by the calculation circuit, the images of each main group into a plurality of sub-groups based on a feature of each image of each main group and a clustering algorithm; and
    positioning, by a positioning circuit of the image positioning device, each sub-group in the area corresponding to each main group based on a relative position relationship between each sub-group of each main group,
    wherein the method further comprises:
    sorting, by a feature capturing circuit of the image positioning device, the images in each main group based on a time sequence of each image;
    obtaining, by the feature capturing circuit, a first relative moving distance between each image and its previous image in each main group based on a second algorithm; and
    obtaining, by the feature capturing circuit, a second relative moving distance between each image and the first image in each main group based on the first relative moving distance corresponding to each image in each main group, wherein the second relative moving distance of each image is taken as the feature of each image.

8. The image positioning method of claim 7, wherein the first algorithm is a deep learning algorithm or a triangle positioning algorithm.

9. The image positioning method of claim 7, wherein the second algorithm is an image comparing algorithm or an IMU algorithm.

10. The image positioning method of claim 7, further comprising:
    classifying, by the positioning circuit, the images in each main group into the plurality of sub-groups based on the second relative moving distance of each image of each main group and the clustering algorithm.

11. The image positioning method of claim 10, further comprising:

obtaining, by the positioning circuit, the relative position relationship between each sub-group in each main group based on the second relative moving distance of each image of each main group and positions each sub-group based on the relative position relationship.

12. The image positioning method of claim 7, wherein the clustering algorithm is a k-means algorithm.

* * * * *